US008538196B2

(12) United States Patent
Wada

(10) Patent No.: US 8,538,196 B2
(45) Date of Patent: Sep. 17, 2013

(54) IMAGE PROCESSING DEVICE, IMAGE PROCESSING METHOD AND COMPUTER READABLE MEDIUM

(75) Inventor: Masanori Wada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 308 days.

(21) Appl. No.: 12/883,780

(22) Filed: Sep. 16, 2010

(65) Prior Publication Data
US 2011/0188753 A1 Aug. 4, 2011

(30) Foreign Application Priority Data

Feb. 3, 2010 (JP) ................................. 2010-022211

(51) Int. Cl.
G06K 9/36 (2006.01)
(52) U.S. Cl.
USPC .......................................................... 382/276
(58) Field of Classification Search
USPC ................. 101/481, 488; 283/105; 382/151, 382/190, 198, 204, 276; 430/22, 54
See application file for complete search history.

(56) References Cited

U.S. PATENT DOCUMENTS

| 7,679,746 B1* | 3/2010 | Walton ........................... 356/432 |
| 7,762,188 B2* | 7/2010 | Iftime et al. ................... 101/478 |
| 2006/0078180 A1* | 4/2006 | Berretty et al. ............... 382/128 |
| 2009/0249666 A1* | 10/2009 | Conant ............................ 40/584 |

FOREIGN PATENT DOCUMENTS

| JP | 2001-175175 A | 6/2001 |
| JP | 2002-156904 A | 5/2002 |
| JP | 2007-178478 A | 7/2007 |

* cited by examiner

Primary Examiner — Gregory F Cunningham
(74) Attorney, Agent, or Firm — Sughrue Mion, PLLC

(57) ABSTRACT

An image processing device includes: an acquisition section that acquires subject image information to be formed on a medium; an extraction section that selectively extracts a part of the subject image information corresponding to a portion of an image not formed due to a plurality of holes of a medium if an image relating to the subject image information is formed on the medium perforated with the plurality of holes; and a generation section that generates new subject image information by generating a command for forming the extracted part of the subject image information.

7 Claims, 8 Drawing Sheets

| HOLE | CENTER COORDINATES | RADIUS |
|---|---|---|
| $H_1$ | $Xh_1, Yh_1$ | $R_1$ |
| $H_2$ | $Xh_2, Yh_2$ | $R_2$ |
| $H_3$ | $Xh_3, Yh_3$ | $R_3$ |
| ⋮ | ⋮ | ⋮ |

IMAGE PROCESSING DEVICE, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2010-022211 filed on Feb. 3, 2010.

BACKGROUND

Technical Field

This invention relates to an image processing device, an image processing method and a computer readable medium.

SUMMARY

According to an aspect of the invention, an image processing device includes: an acquisition section that acquires subject image information to be formed on a medium; an extraction section that selectively extracts a part of the subject image information corresponding to a portion of an image not formed due to a plurality of holes of a medium if an image relating to the subject image information is formed on the medium perforated with the plurality of holes; and a generation section that generates new subject image information by generating a command for forming the extracted part of the subject image information.

BRIEF DESCRIPTION OF THE DRAWINGS

Exemplary embodiment(s) of the present invention will be described in detail based on the following figures, wherein.

DETAILED DESCRIPTION

Figure 1:
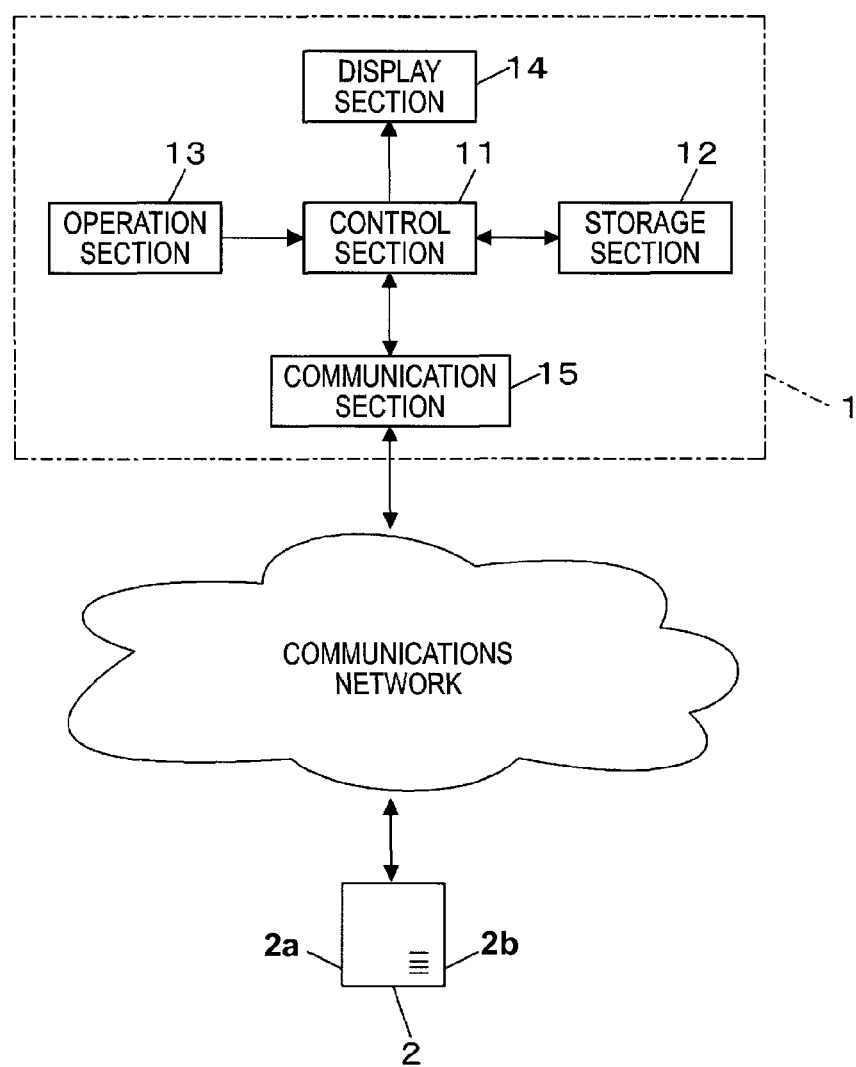
FIG. 1 is a block diagram to show a configuration example and a connection example of an image processing device according to an embodiment of the invention.

An exemplary embodiment of the invention will be discussed with reference to the accompanying drawings. An image processing device 1 according to the embodiment of the invention is implemented as a computer including a control section 11, a storage section 12, an operation section 13, a display section 14, and a communication section 15 as illustrated in FIG. 1. The image processing device 1 is connected to an image forming device 2.

The image forming device 2 is, for example, a printer and forms an image on a sheet as an example of a recording medium in accordance with an image forming command accepted from the image processing device 1. In an example of the embodiment, a recording medium supplied to the image forming device and accepting image forming is a sheet perforated with plural holes as illustrated in FIGS. 2A to 2C.

Figure 2A:
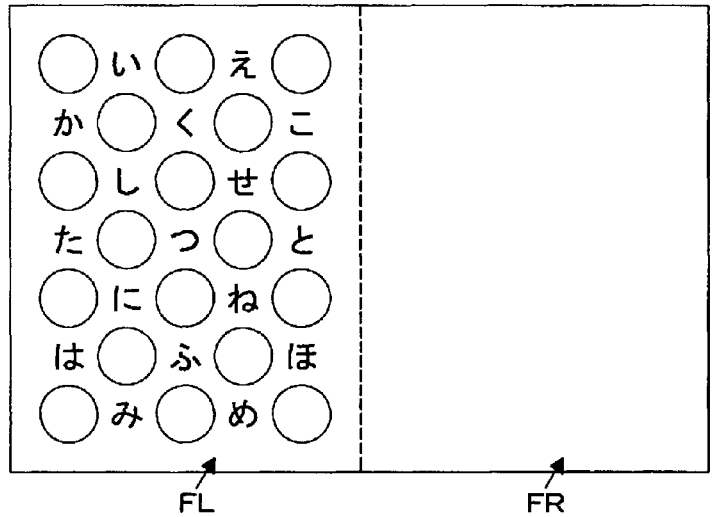
FIGS. 2A to 2C are schematic representations to represent an example of a sheet to form an image generated by the image processing device according to the embodiment of the invention.
Figure 2B:
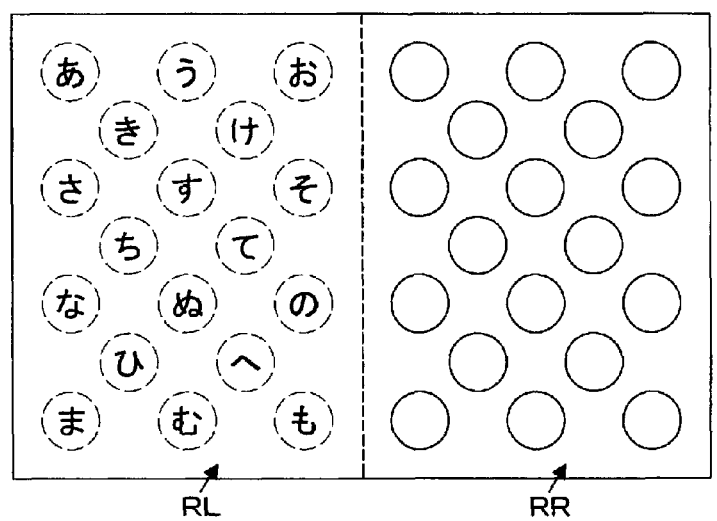
Figure 2C:
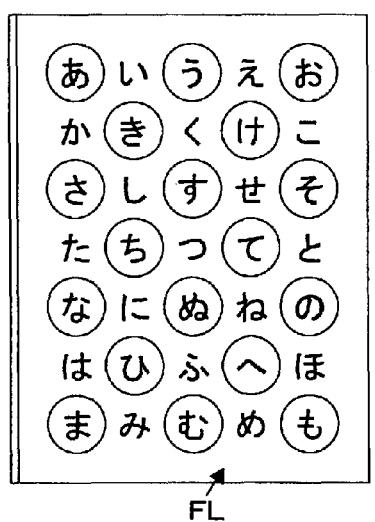

A plurality of holes is made in the left half side (FL) of the sheet whose surface is illustrated in FIG. 2A (in the example in FIGS. 2A to 2C, A4 sheet is placed in landscape orientation). In the embodiment, an image on the first page is formed on the left half side (FL) of the sheet. In this sense, in the example in FIGS. 2A to 2C, the left half side (FL) of the sheet is called "first face." An image formed on the first face is formed in a state in which parts are lost due to the holes.

Then, images in the lost portions are formed on the left half side (RL) of the back of sheet (FIG. 2B). That is, the sheet is folded so that the left half side (RL) of the back of the sheet overlaps the back of the first face, whereby the images formed on the left half side (RL) of the back of the sheet can be visually recognized through the holes. In this sense, in the example in FIGS. 2A to 2C, the left half side (RL) of the back of the sheet is called "second face."

In FIG. 2B of a back view of a sheet, for description, the positions of holes opened in the sheet FL face (namely, corresponding to an RR face on the back) when the sheet is folded half along the longitudinal center line (indicated by a dashed line in the figure) are indicated by dashed lines.

As shown in FIGS. 2A and 2B, when the sheet is folded half along the longitudinal center line, portions which should be formed on the first face, but are lost due to the holes are made up for by the images formed at the corresponding positions on the second face through the holes and the whole of the images which should be essentially formed is visually recognized (FIG. 2C).

To discard, if the sheet is broken along the longitudinal center line, the image shown in FIG. 2A (image formed on the first face) and the image shown in FIG. 2B (image formed on the second face) are separated. Each image after the separation has parts lost and readability of information represented by the image which should be essentially formed is lost. FIGS. 2A to 2C shows an example wherein holes are circular and are arranged periodically, but the embodiment is not limited to such a sheet example. In the example in FIGS. 2A to 2C, the first face and the second face are overlapped by folding, but three or more faces may be overlapped. A plurality of sheets may be overlapped and pressure-joined, etc., thereby overlapping faces without overlapping the first face, second face . . . by folding a sheet like a pressure-joined postcard. In this case, the pressure-joined sheets are peeled off and are separated, whereby each image after the separation has parts lost and readability of information represented by the image which should be essentially formed is lost.

One of the functions of the image processing device 1 of the embodiment is to generate a forming command of an image required for reproducing the whole image which is visually recognized through holes made in a medium like the image formed on the second face and should be formed together with parts of the image formed on a medium face perforated with holes (for example, the first face described above).

The control section 11 of the image processing device 1 is a program control device of a CPU (Central Processing Unit), etc., and operates in accordance with a program stored in the storage section 12. The control section 11 acquires image information to be formed on a medium as subject image information.

When an image relating to the subject image information is formed on a medium perforated with a plurality of holes, parts of the subject image information corresponding to portions of the image not formed due to the holes are selectively extracted and new subject image information is generated based on the extracted parts of the subject image information. Detailed processing of the control section is described later.

The storage section 12 is a memory device, etc., and retains the program executed by the control section 11. The program is provided in a state in which it is stored in a computer readable medium such as a DVD-ROM (Digital Versatile Disc Read-Only Memory), for example, and is copied into the storage section 12. The storage section 12 also operates working memory of the control section 11. It may record image information to be formed on a recording medium.

Figure 3:
FIG. 3 is a schematic representation to represent an example of information relating to holes of a sheet, used by the image processing device according to the embodiment of the invention.

In an example of the embodiment, information representing the position of each hole made in a sheet supplied to the image forming device 2 is recorded in the storage section 12 as medium information. An example of the medium information is a list of information containing center coordinate information of a hole area and information of the radius or the diameter of the hole if the hole is circular, for example, as information representing an area where a hole is opened (hole area) (the information will be hereinafter called hole area information) as illustrated in FIG. 3. If the hole is rectangular, the list may be a list of information containing the coordinates of the upper left corner of the hole and the coordinates of the lower right corner of the hole. If the medium is rectangular, for example, the coordinate information may be as follows: The lower left corner is the origin, an X axis which becomes positive to the right along the base and a Y axis which becomes positive upward along the longitudinal line may be defined and a position may be represented in predetermined units (for example, point units).

The operation section 13 is a keyboard, a mouse, etc., accepts command operation of the user, and outputs it to the control section 11. The display section 14 is a display, etc., and displays information in accordance with a command input from the control section 11. The communication section 15 is a network interface, etc., and transmits and receives information to and from a device of the image forming device 2, etc., through a communications network. The communication section 15 receives information arriving through the communications, outputs the information to the control section 11, and transmits information through the communications network to the destination specified from the control section 11 in accordance with a command input from the control section 11.

Figure 4:
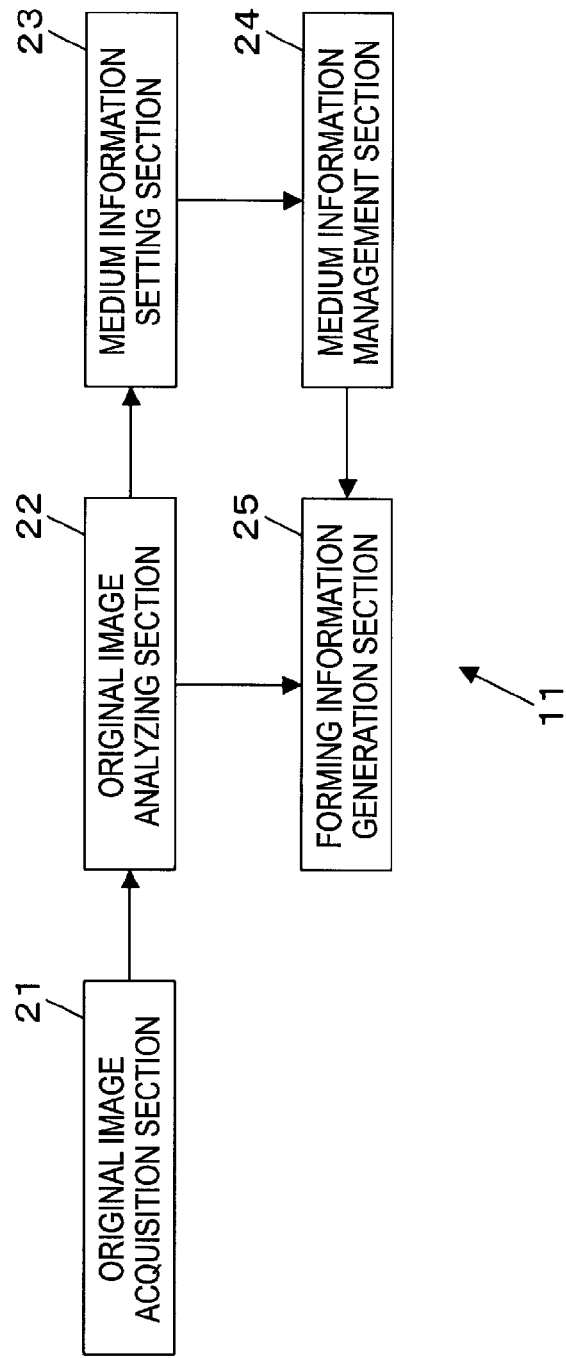
FIG. 4 is a function block diagram to represent an example of the image processing device according to the embodiment of the invention.

The operation of the control section 11 of the image processing device 1 according to the embodiment is as follows: The control section 11 of the embodiment executes the program stored in the storage section 12, thereby functioning as an original image acquisition section 21, an original image analyzing section 22, a medium information setting section 23, a medium information management section 24, and a forming information generation section 25 as illustrated in FIG. 4.

The original image acquisition section 21 acquires image information to be formed on a medium as subject image information. For example, if the subject image information is recorded in the storage section, it may be acquitted from the storage section 12; the subject image information can also be acquired through the communications network from a user terminal (not shown) and may be acquired from any place. In the embodiment, image information is information containing an image of a character string and is represented in a page description language of PostScript (registered trademark), PDF (Portable Document Format), etc. Specifically, the image information contains a sheet setting portion (P) and an image content portion (D). The sheet setting portion (P) is information representing the size, the type, etc., of sheet and the image content portion (D) represents an image to be formed. In the embodiment, the sheet setting portion (P) contains font setting information (information setting the character shape, the character size, etc.: Df), character code representing each of characters making up a character string (information indicating what character is to be printed), and a row of position information representing the forming position of each character (Dc).

The original image analyzing section 22 outputs the information of the sheet setting portion (P) of the acquired image information to the medium information setting section 23. The original image analyzing section 22 outputs the image content portion (D) of the acquired image information to the forming information generation section 25.

The medium information setting section 23 accepts information of the sheet setting portion (P) from the original image analyzing section 22. The medium information setting section 23 commands the medium information management section 24 to output information of the sheet specified by the accepted information. As an example, the sheet setting portion (P) contains information to specify the size of the sheet and a sheet supply section 2a or 2b (sheet tray, etc.,) provided in the image forming device 2 and information as to whether or not to execute print on double sides of the sheet, etc. The medium information setting section 23 outputs the information to the medium information management section 24 and commands the medium information management section 24 to output information concerning the sheet specified by the information.

The medium information management section 24 reads information concerning the sheet specified by the command from the storage section in accordance with the command input from the medium information setting section 23 and outputs the information to the forming information generation section 25. Specifically, the information concerning the sheet, read by the medium information management section 24 from the storage section 12 contains information to specify the range in which an image can be formed on the sheet face and hole area information if the sheet is formed with a hole.

The forming information generation section 25 accepts information of the image content portion (D) from the original image analyzing section 22. The forming information generation section 25 accepts information concerning the sheet such as information of the range in which an image can be formed from the medium information management section 24. The forming information generation section 25 generates a bit map image to be formed in the range in which an image can be formed based on information contained in the accepted image content portion (D).

Further, the forming information generation section 25 accepts information concerning the sheet such as hole area information from the medium information management section 24. The forming information generation section 25 extracts a portion overlapping the hole area (portion not formed due to the hole). The extracting processing can be performed by ANDing (finding both significant pixels) a mask image where each hole area is set to a significant pixel and each significant pixel in the accepted bit map image (colored pixel rather than ground color of the medium).

According to the processing, each part corresponding to a portion where an image is not formed due to a hole made in the sheet is selectively extracted in the subject image information. The forming information generation section 25 generates a command for forming the extracted portion on the face of the sheet visually recognized through holes (second face). Accordingly, new subject image information is generated based on the part of the subject image information.

The forming information generation section 25 generates a command for forming the generated bit map image on the face of the sheet perforated with holes (first face) and a command for forming each part of the bit map image corresponding to the portion where an image is not formed due to a hole of the sheet on the sheet face visually recognized through each hole (second face).

Figure 5A:
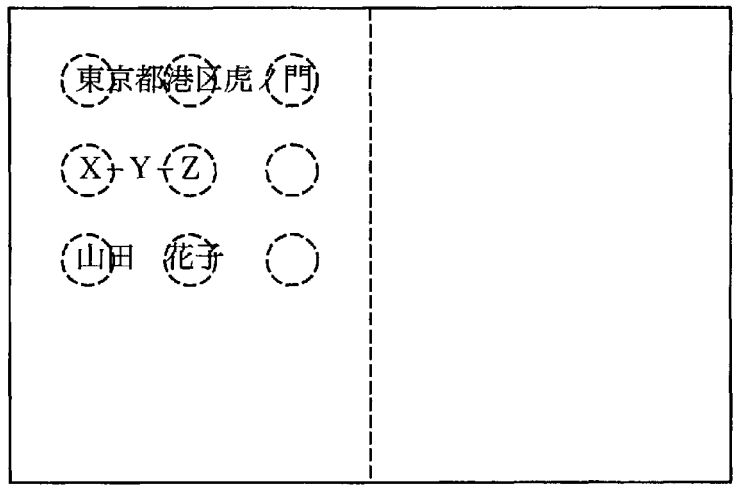
FIGS. 5A to 5C are schematic representations to represent an operation example of the image processing device according to the embodiment of the invention.

The control section of the embodiment has the configuration described above and operates as follows: It is assumed that a character string as shown in FIG. 5A is printed by way of example. In FIG. 5A, the position of each hole of a used sheet is represented by a circle of a dashed line and the sheet is mountain held in the center dashed line after image formation. In the example, the left of the back becomes a sheet face visually recognized through holes.

Figure 6:
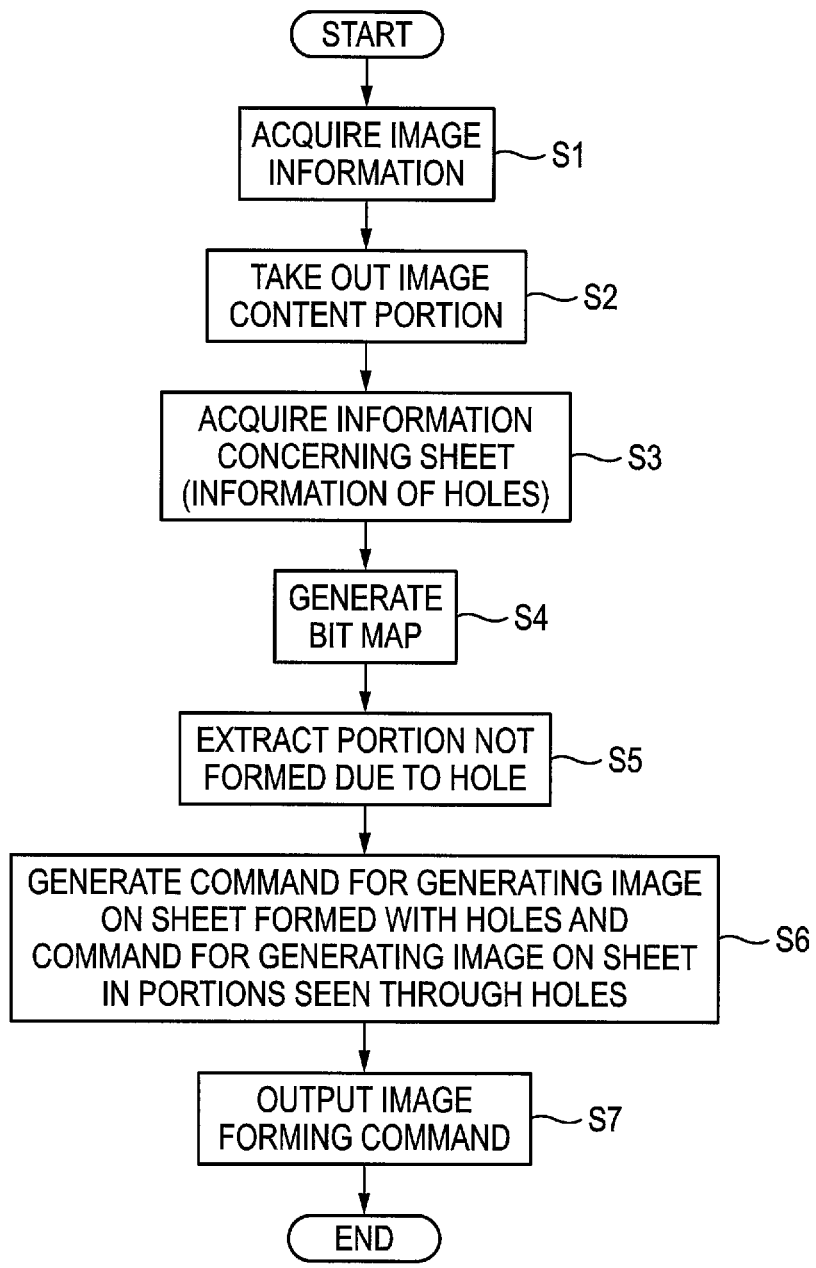
FIG. 6 is a flowchart to represent an operation example of the image processing device according to the embodiment of the invention.

The control section 11 acquires image information indicating that the character string illustrated in FIG. 5A should be formed on the sheet illustrated in FIG. 5A as illustrated in FIG. 6 (S1). The control section 11 takes out information of a sheet setting portion and an image content portion representing an image of the character string to be formed.

The control section 11 reads information concerning the sheet specified by the information of the sheet setting portion from the storage section 12 (S3). Here, information concerning a sheet formed with holes as shown in FIG. 5A is read from the storage section 12. The information contains hole area information.

On the other hand, the control section 11 generates a bit map image to be formed in the range in which an image can be formed on the sheet based on the information of the range in which an image can be formed concerning the sheet and the information of the image content portion (S4). The bit map image generated here is an image of the character string shown in FIG. 5B.

The control section 11 references hole area information as information concerning the sheet and extracts each portion overlapping each hole existing at the position represented by the information concerning the sheet (portion not formed due to hole) in the generated bit map information (S5).

Figure 5B:
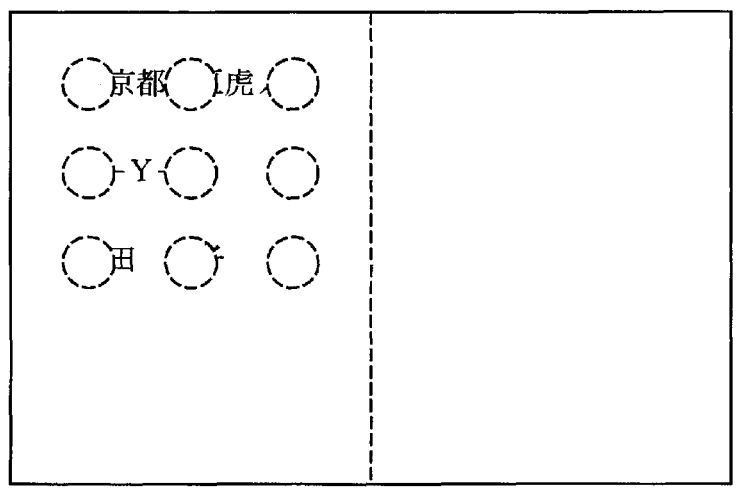
Figure 5C:
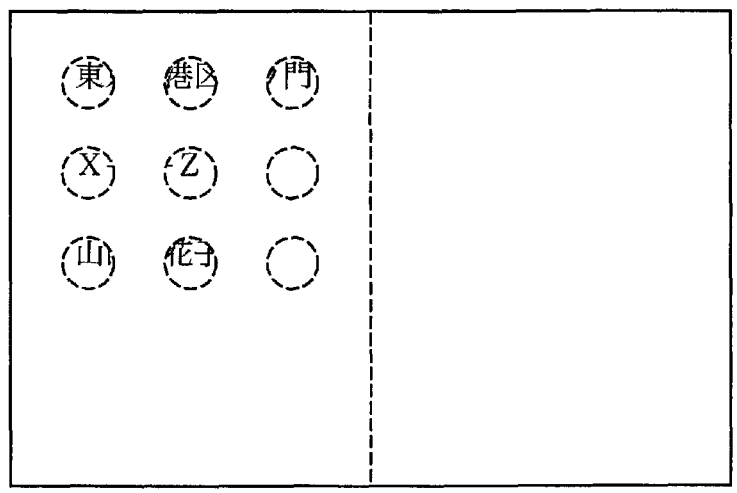

The bit map image extracted here is selective extraction of significant bits contained in the portions visually recognized through the holes as shown in FIG. 5C (in FIG. 5C, for the description, the hole position is shown by a circle of a dashed line, the circle of the dashed line may be undrawn actually.)

The control section 11 generates a command for forming the generated bit map image (FIG. 5B) on the face of the sheet perforated with holes (first face) (command I) and a command for generating the bit map image illustrated in FIG. 5C corresponding to the portions where no image is formed due to the holes of the sheet (command II) (S6). The control section 11 outputs the commands I and II to the image forming device 2 as commands for forming the image on the surface and the back of the sheet formed with the holes (S7).

When the image forming device 2 forms an image on double sides of the sheet formed with the holes in accordance with the command, print at the hole positions are lost on the surface and an image as illustrated in FIG. 5B is formed on the sheet. An image illustrated in FIG. 5C is formed on the back.

When the sheet is folded in the center dashed line and is folded so that the print part in FIG. 5B overlaps the print part in FIG. 5C (so that the image in FIG. 5C can be visually recognized through the holes) (pressure joint may be performed in the fold state).

When the sheet is broken in the hold line, the image illustrated in FIG. 5B and the image illustrated in FIG. 5C are separated and readability substantially is lost.

In the example, as the image to be formed on the sheet surface, the bit map image generated by the forming information generation section 25 is used as it is; however, the embodiment is not limited to it. In an example of the embodiment, the control section 11 subtracts the bit map image extracted as in FIG. 5C from the generated bit map (the bit map image of the character string shown in FIG. 5A) (or removes significant pixels in a mask with hole areas as significant pixels) and generates an image circumventing the hole portions shown in FIG. 5B as the forming information generation section 25. The control section 11 outputs a command for forming a bit map image extracting the actually formed portions circumventing the hole portions as command I. In this case, the image in the portions not formed due to the holes is previously removed.

[Example of Perforating at Image Forming Time]

In the description given above, it is assumed that a sheet is perforated with holes, but the image forming device 2 may be provided with a device for perforating a sheet with a hole and the sheet may be perforated with a hole before or after image formation.

In this case, the control section 11 of the image processing device 1 generates hole area information representing the position and the size of each perforated hole (at least one). When performing processing as the forming information generation section 25, the control section 11 uses the generated hole area information in place of information accepted from processing as the medium information management section 24, generates a forming command of an image to be formed on the first face and the second face, and outputs generated hole area information together with the image forming command to the image forming device 2.

The image forming device 2 forms an image on a sheet in accordance with the input image forming command and perforates the sheet where the image is formed with each hole at the position and of the size represented by the input hole area information.

The control section 11 of the image processing device 1 may determine any one of the position, the shape, or the size as the hole area information at random.

Modified Example

The position and the size of each character are determined and an image is formed regardless of the position or the size of a hole. However, the hole may have a size to completely contain at least one formed character and the forming information generation section 25 may adjust the character drawing position so that an image of at least one character is contained in the hole.

In this case, a hole made in a sheet (or a hole commanded to be made in a sheet) is of a size that can contain the maximum rectangle (target rectangle) in predetermined character font (predetermined font face and font size). For example, if the hole is circular, the circle is larger than a circle circumscribing the target rectangle.

To arrange a character string on a plurality of rows, each of the holes made in a sheet (or holes commanded to be made in a sheet) falls within any row. For example, if the width of the target rectangle in the Y axis direction is Yt and the character string based on the character font are arranged on a plurality of rows with row spacing of Yd in the Y axis direction, the centers of at least any two holes are at a distance of an integral multiple of Yt+Yd (0 times, 1 time, 2 times . . . ) from each other in the Y axis direction.

The forming information generation section 25 generates a bit map image to be formed based on the image content portion (D) accepted from the original image analyzing section 22 and information concerning a sheet such as information of the range in which an image can be formed, information to specify the position of each hole, etc., accepted from the medium information management section 24.

Specifically, the character font (information of font face, font size, etc.,), the forming position, and character code (information indicating what character for each character is specified in the image content portion (D) accepted by the forming information generation section 25 as already described.

Figure 7A:
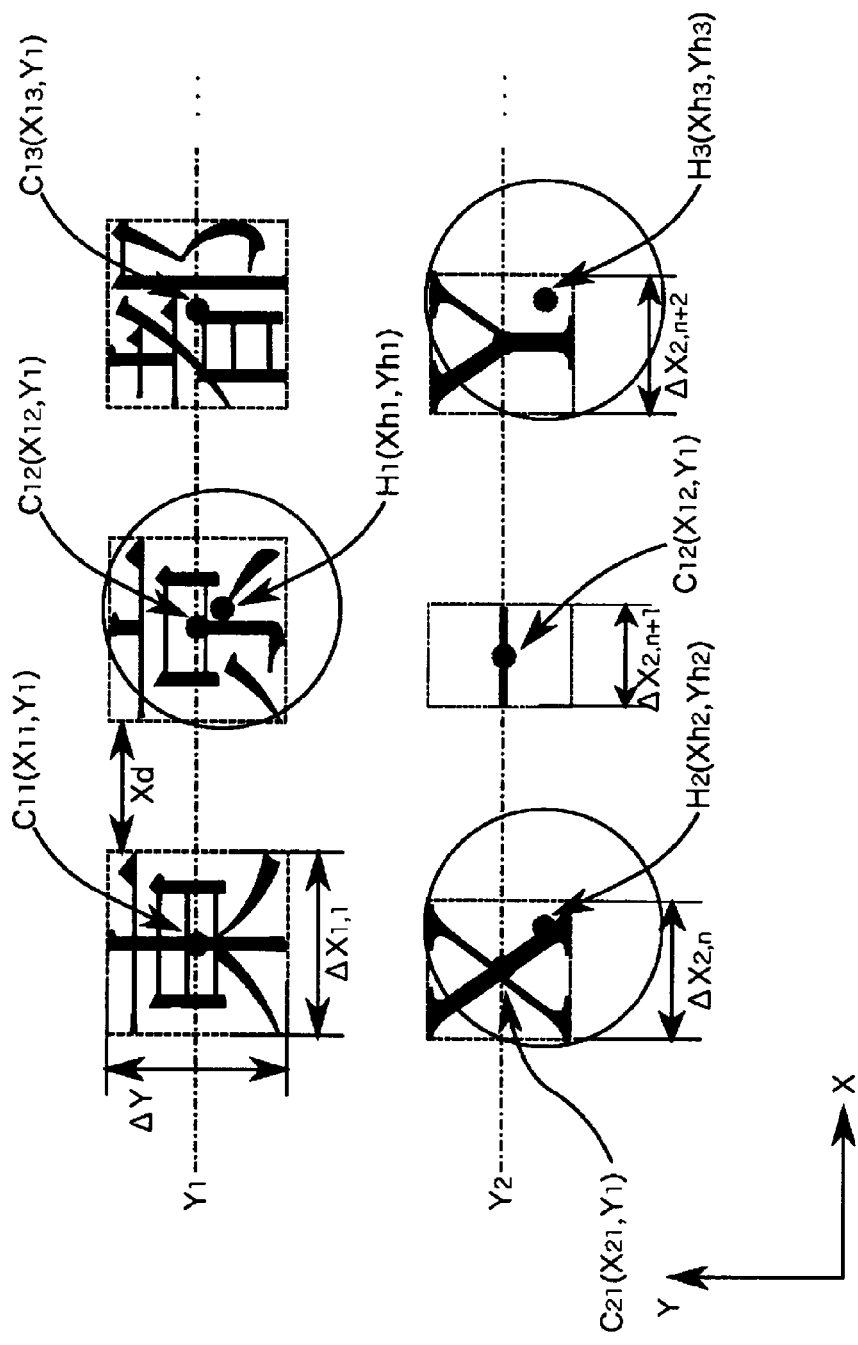
FIGS. 7A to 7C are schematic representations to represent another operation example of the image processing device according to the embodiment of the invention.

As a matter of convenience, instead of describing a character sting formed of the three Chinese characters written on the first row in FIG. 7A, the following example uses "TKO" to express these Chinese characters in the specification. Specifically, "T" indicates the character on the left side of the character string, "K" indicates the character in the middle of the character string and "O" indicates the character on the right side of the character sting.

As an example, a command for forming a character string of "TKO" in landscape orientation from coordinates (100, 100) becomes
/XXX-Mincho-EUC-H
findfont 12 scalefont setfont
100 100 moveto
(TKO) show
and the like in the image content portion (D). Here, "/XXX-Mincho-EUC-H findfont 12 scalefont setfont" is a command for drawing the following character string using horizontal line orientation font of name "XXX-Mincho" in a size of 12 points. "100 100 moveto" is a command for moving the drawing position to coordinates (100, 100) and "(TKO) show" is a command for drawing a character string of (TKO). This example is an example in PostScript (registered trademark), but any other page description language may be adopted.

The forming information generation section 25 references the information of the character font specified in the image content portion (D) and checks whether or not each hole made in the sheet to form the character string is a size containing the character font (not larger than the target rectangle). If the character font specified in the image content portion (D) is larger than the target rectangle, a correction is made so that the character font does not become larger than the target rectangle by making the font size small or changing the font face (at the time, an error message may be presented to the user and the user may be prompted to make a correction).

If the character font specified in the image content portion (D) is not larger than the target rectangle, the forming information generation section 25 generates information of the forming position of each character and the forming range of each character (a rectangle circumscribing the bit map of the character or the like). This processing is processing widely performed in processing of page description language and therefore will not be discussed in detail. According to the processing, the forming information generation section 25 obtains coordinate information of a rectangle circumscribing the drawing range of each of "T," "K," "O" making up the character string of "TKO" in the example described above.

Hereinafter, information representing the placement position of the character string containing the coordinate information of the rectangles will be called character area information.

The forming information generation section 25 references the hole area information input from the medium information management section 24 and performs the following processing for each of hole areas contained in the hole area information: As illustrated in FIG. 7A, the forming information generation section 25 uses width $\Delta Xij$ of the character rectangle of the ith row jth character, distance between adjacent rectangles in the X axis direction (Xd), height of each character rectangle (constant) $\Delta Y$, row-to-row distance Yd, and center coordinates of the first rectangle $(X_1, Y_1)$ about the coordinate information of rectangle contained in the character area information (hereinafter, center Y coordinate of character rectangle on ith row will be Yi) and finds center coordinates Cij (Xcij, Yci) of the rectangle relating to the jth character on the ith row as follows:

$$C_{ij}(Xc_j, Yc_i) = \left( X_1 + \sum_{k=1}^{j} \{\Delta X_{ik} + Xd\}, Y_1 + \sum_{k=1}^{i} \{\Delta Y + Yd\} \right) \quad \text{[Expression 1]}$$

The characters are arranged in the X axis direction as one row and the rows are arranged in the Y axis direction, but the embodiment is not limited to the mode. To adopt any other arrangement method, the computation method of the character placement position may be changed as required conforming to the arrangement method.

The forming information generation section 25 sets the center of a hole represented by the hole area information as Hk (Xhk, Yhk) and searches for center coordinates Cij of the rectangle of the character nearest to each Hk. Processing relating to this search is processing for searching the smallest Euclidean distance between (Xhk, Yhk) and (Xcj, Yci). Here, for example, it is assumed that the center coordinates of the rectangle of the character nearest to the hole Hk whose center coordinates are (Xhk, Yhk) are (Xcj, Yci). Then, the forming information generation section 25 moves the center coordinates of the rectangle of the character to Xhk. The forming information generation section 25 adds Yhk-Yci to the value of Ydi to update Ydi.

Figure 7B:
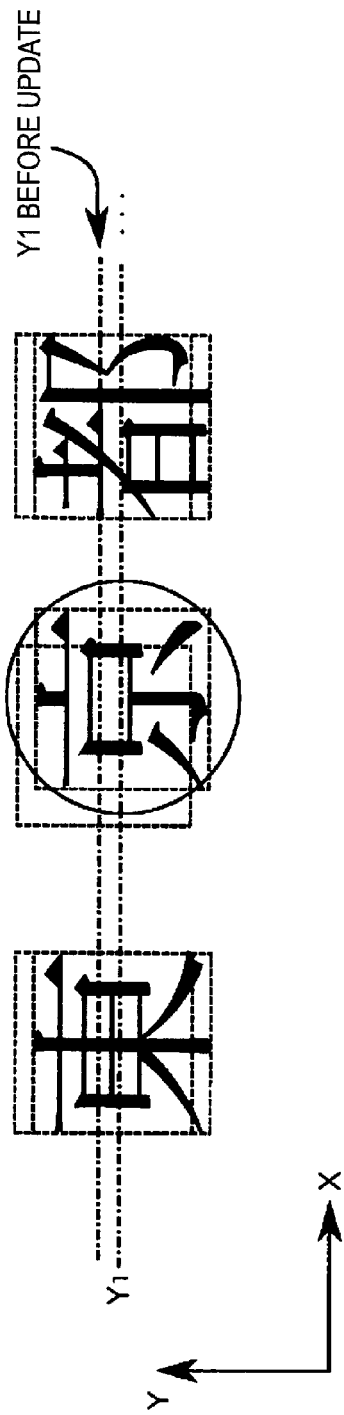

The operation of this example will be discussed with FIGS. 7A to 7C. When accepting the image content portion (D) containing a command to place a character string of "TKO . . . " on the first row and a character string of "X-Y- . . . " on the second row, the forming information generation section 25 searches for a character rectangle whose center coordinates are nearest to the center coordinates of hole for each of the center coordinates (H1, H2, . . . ) of holes. In an example in FIG. 7A, the case where the character of "K" (the second character on the first row) is nearest to the hole H1 is illustrated. Then, the Y coordinate Y1 on the first row is moved by the difference between the center coordinates of the hole H1 and the center coordinates of the character rectangle of "K" Yh1-Y1 to set Y1=Yh1 (FIG. 7B). In FIG. 7B, the center coordinates of the character rectangle of "K" is moved by the difference between the center coordinates of the hole H1 and the center coordinates of the character rectangle of "K" Xh1-X12 in the X axis direction and the X coordinate of the center position of the character rectangle of "K" is set to Xh1. Thus, the character rectangle of "K" is contained in the hole H1.

Figure 7C:
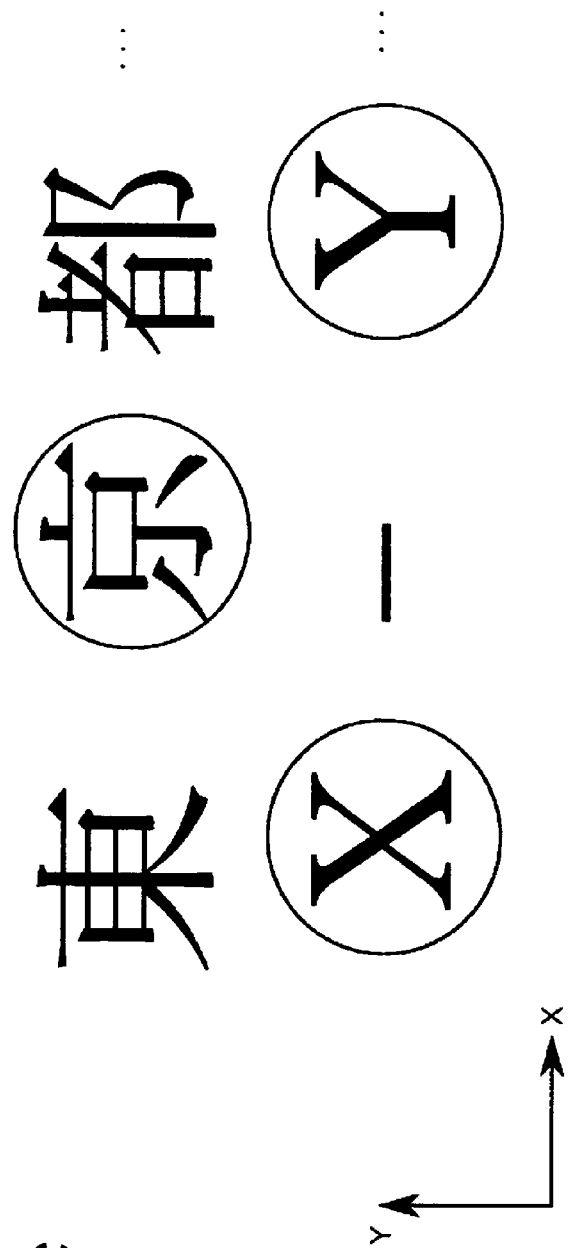

Similar processing is performed for other holes and the result as shown in FIG. 7C by way of example is obtained. In FIG. 7C, each character that can be visually recognized through a hole is shown in a circle representing the hole.

The forming information generation section 25 thus adjusts the position of each character and draws a bit map of each character at the position after the adjustment to generate a bit map image. The forming information generation section 25 extracts a portion overlapping the hole area (portion not formed due to the hole) in the bit map image. The extracting processing can be performed by ANDing (finding both significant pixels) a mask image where each hole area is set to a significant pixel and each significant pixel in the accepted bit map image (colored pixel rather than ground color of the medium) in a similar manner to that described above.

According to the processing, in the subject image information, a part corresponding to a portion of an image not formed due to a hole made in the sheet is selectively extracted. In the example, the whole of one character is extracted in one hole as illustrated in FIG. 7C.

The forming information generation section 25 generates a command for forming the extracted portion on a sheet face visually recognized through the hole. Accordingly, new subject image information is generated based on a part of the subject image information. The forming information generation section 25 generates a command for forming the generated bit map image on the face of the sheet perforated with holes and a command for forming a part of the bit map image corresponding to the image portion not formed due to the holes of the sheets on the face of a sheet visually recognized through the holes.

As already described, as the image to be formed on the sheet surface, the bit map image to be formed on the face of the sheet visually recognized through holes may be subtracted from the bit map image to be formed on the sheet surface (or significant pixels in a mask with hole areas as significant pixels may be removed) and an image circumventing the hole portions may be generated as the image to be formed on the sheet surface without using the bit map image generated by the forming information generation section 25 as it is.

Further, when a character rectangle is moved in the X axis direction, the forming information generation section 25 may move character rectangles relating to the k+1st character adjacent to after the character rectangle (kth character) moved in the X axis direction and the later characters by the move amount of the kth character rectangle (the difference between the position of the initial kth character rectangle on the X axis and the position of the character rectangle on the X axis after the move) in the X axis direction.

Modified Example 2

Further, the above-described processing can be simplified by previously associating placement of each character and placement of each hole. That is, in a command contained in the image content portion (D) input to the forming information generation section 25, a character to be drawn is drawn, for example, in a rectangle with a grid represented by coordinates (n·Xg, m·Yg) (where n and m are each an integer and Xg and Yg are each a constant) as the center, each hole made in a sheet (or each hole commanded to be made in a sheet) is of a size that can contain the maximum rectangle (target rectangle) in predetermined character font (predetermined font face and font size), and the center coordinates of each hole are selected from within (n·Xg, m·Yg). In this case, the number of holes is smaller than the number of characters to be drawn. For example, the number of holes is smaller than ⅔ of the number of characters to be drawn N.

In this case, previous adjustment is made so that the positions of the holes match the positions of some characters contained in a character string and thus the forming information generation section 25 need not perform processing of moving the positions of the characters, etc.

In the examples given so far, the forming information generation section 25 draws an image and generates a bit map image. However, if the whole of one or more characters is visually recognized through each hole as described above, a drawing command of a character visually recognized through the hole is extracted from the image content portion (D) and the sheet setting portion (P), etc., may be added to the extraction portion to generate an image forming command for forming an image on a sheet visually recognized through each hole, and the sheet setting portion (P), etc., may be added to the image content portion (D) from which the drawing command of a character visually recognized through the hole is extracted to generate an image forming command for forming an image on the face of a sheet perforated with holes. The image forming commands may be output to the image forming device 2.

[Example of Overlapping Three or More Faces]

Further, in the description given so far, as the example of overlapping the first face and the second face of a sheet, the image to be drawn is divided into two of an image to be formed on the face of a sheet perforated with holes (first face) and an image to be formed on parts of the face of a sheet visually recognized through the holes (second face).

However, the position of the second face corresponding to a part of the holes made in the first face may also be perforated with a hole and a third face visually recognized through the holes of the first face and the second face may be further overlapped. To do this, one sheet may be folded like letter Z or three sheets may be overlapped and pressure joined.

In this case, the forming information generation section 25 may extract the portion overlapping the position of the hole made in the second face in the image formed on the second face and may generate an image to be formed on the third face. That is, the forming information generation section 25 may perform sequential processing of extracting the portion overlapping the position of the hole made in the nth face in the image formed on the nth face and generating an image to be formed on the n+1st face and extracting the portion overlapping the position of the hole made in the n+1st face in the image formed on the n+1st face and generating an image to be formed on the n+2nd face . . . .

[Example of Generating Camouflage Image]

The forming information generation section 25 may draw any image in a portion hidden by the p−1st face in the pth face (p is an integer greater than 1), namely, an area corresponding to any other portion than a portion of an image not formed from the first face to the p−1st face due to holes of a medium made from the first face to the p−1st face (portion not visually recognized through the holes). The image may be a camouflage image such as a random bit map, a random patter, a character selected at random.

The forming information generation section 25 may add a command for forming such a camouflage image in the above-mentioned portion of the pth face (portion not seen through holes of a medium made from the first face to the p−1st face) to a command for forming an image extracted as an image to be formed on the pth face. Accordingly, when the faces of the medium are separated at the discarding time, etc., the image on each face is camouflaged.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
an acquisition section which acquires subject image information to be formed on a medium having a first side and a second side;
an extraction section which selectively extracts a part of the subject image information to be formed on the second side, the part corresponding to a portion of the subject image information not formed on the first side due to a plurality of holes on the first side of the medium, wherein the part of the subject image information formed on the second side corresponds to positions of the plurality of the holes on the first side;
a generation section which generates new subject image information by generating a command for forming the extracted part of the subject image information on the second side; and
a forming section which forms the new subject image information on the second side based on the generated command.

2. The image processing device according to claim 1, wherein each of the holes on the first side has a size to completely contain characters printed on the second side based on the new subject image information.

3. The image processing device according to claim 1, wherein the generation section generates the new subject image information by adding another command for forming a camouflage image in addition to the extracted part of the subject image information on the second side.

4. An image processing device comprising:
an acquisition section which acquires subject image information to be formed on a medium;
an extraction section which selectively extracts a part of the subject image information corresponding to a portion of an image not formed due to a plurality of holes of a medium when the image relating to the subject image information is formed on the medium perforated with the plurality of holes;
a generation section which generates new subject image information by generating a command for forming the extracted part of the subject image information;
a determination section which determines at least one of perforation positions and sizes of the holes in the medium according to random numbers; and
a perforating device,
wherein the generation section causes the perforating device to form the holes of the determined sizes at the determined perforation positions in the medium, and
the extraction section acquires information of the perforation positions and the sizes of the holes determined by the determination section and when the image relating to the subject image information is formed on the medium perforated with the holes of the determined sizes at the determined perforation positions, selectively extracts the part of the subject image information corresponding to the portion of the image not formed due to the holes of the medium.

5. An image processing method comprising:
acquiring, using a processor, subject image information to be formed on a medium having a first side and a second side;
selectively extracting a part of the subject image information to be formed on the second side, the part corresponding to a portion of the subject image information not formed on the first side due to a plurality of holes on the first side of the medium, wherein the part of the subject image information formed on the second side corresponds to positions of the plurality of the holes on the first side;
generating new subject image information by generating a command for forming the extracted part of the subject image information on the second side; and
forming the new subject image information on the second side based on the generated command.

6. A non-transitory computer readable medium storing a program causing a computer to execute a process for image processing, the process comprising:
acquiring subject image information to be formed on a medium having a first side and a second side;
selectively extracting a part of the subject image information to be formed on the second side, the part corresponding to a portion of the subject image information not formed on the first side due to a plurality of holes on the first side of the medium, wherein the part of the subject image information formed on the second side corresponds to positions of the plurality of the holes on the first side;
generating new subject image information by generating a command for forming the extracted part of the subject image information on the second side; and
forming the new subject image information on the second side based on the generated command.

7. The image processing device according to claim 1, further comprising:
a determination section which determines at least one of perforation positions and sizes of the holes in the medium according to random numbers; and
a perforating device,
wherein the generation section causes the perforating device to form the holes of the determined sizes at the determined perforation positions in the medium, and
the extraction section acquires information of the perforation positions and the sizes of the holes determined by the determination section and when the image relating to the subject image information is formed on the medium perforated with the holes of the determined sizes at the determined perforation positions, selectively extracts the part of the subject image information corresponding to the portion of the image not formed due to the holes of the medium.

* * * * *